United States Patent
Zhang et al.

(10) Patent No.: US 7,109,891 B2
(45) Date of Patent: Sep. 19, 2006

(54) METHOD FOR ARRANGING MANDARIN PHONETIC SYMBOLS ON A KEYPAD

(75) Inventors: Hai-Ming Zhang, Shanghai (CN);
Shih-Kuang Tsai, Taipei Hsien (TW);
Dai-Shui Ho, Taipei Hsien (TW)

(73) Assignee: Inventec Appliances Corp., Taipei (TW)

( * ) Notice: Subject to any disclaimer, the term of this patent is extended or adjusted under 35 U.S.C. 154(b) by 714 days.

(21) Appl. No.: 10/064,106

(22) Filed: Jun. 12, 2002

(65) Prior Publication Data

US 2003/0231120 A1 Dec. 18, 2003

(51) Int. Cl.
*H03K 17/94* (2006.01)

(52) U.S. Cl. .............................. 341/22; 345/171; 341/28

(58) Field of Classification Search .................. 341/22, 341/28; 345/171; 400/110; 434/157; 379/368
See application file for complete search history.

(56) References Cited

U.S. PATENT DOCUMENTS

| 5,924,803 | A | * | 7/1999 | Curtin et al. ............... 400/100 |
| 6,007,339 | A | * | 12/1999 | Zen et al. ................... 434/157 |
| 6,686,852 | B1 | * | 2/2004 | Guo ............................ 341/22 |

* cited by examiner

*Primary Examiner*—Michael Horabik
*Assistant Examiner*—Hung Dang
(74) *Attorney, Agent, or Firm*—Winston Hsu

(57) ABSTRACT

A method for arranging 37 Mandarin Phonetic Symbols (MPS) on a keypad includes arranging the 37 symbols onto 12 keys of the keypad. With this particular arrangement, a maximum number of combinations of MPS generated by pressing three keys on the keypad is reduced from 48 to 16, making input of Chinese characters considerably faster and more convenient.

19 Claims, 5 Drawing Sheets

METHOD FOR ARRANGING MANDARIN PHONETIC SYMBOLS ON A KEYPAD

BACKGROUND OF INVENTION

1. Field of the Invention

The present invention relates to a language input method, and more specifically, to a method for inputting Mandarin Phonetic Symbols using a keypad.

2. Description of the Prior Art

Every written character in Chinese can be represented by a phonetic representation of the character. Of all Chinese dialects, Mandarin Chinese is most widely spoken. Accordingly, there are many phonetic systems available for representing Mandarin pronunciations of Chinese characters. One such phonetic system that is primarily used in Taiwan is called Mandarin Phonetic Symbols (MPS). The MPS phonetic system consists of 37 symbols that can be combined to represent every phonetic sound spoken in Mandarin.

When using electronic devices such as cellular phones or personal digital assistants (PDAs), the 37 symbols are usually mapped to keys on an input keypad. By clicking on appropriate keys, Chinese characters can be entered into the electronic device.

Please refer to FIG. 1A. FIG. 1A is an electronic device 10 with a keypad 13 used to input MPS according to the prior art. FIG. 1A shows 12 standard keys present on a normal telephone, namely "1–9", "*", "0", and "#". Notice, however, that only 10 of the 12 keys are used for mapping MPS. Each character in the Chinese language can be represented by the combination of one, two, or three Mandarin Phonetic Symbols. When three symbols are used to represent a Chinese character, a first, a middle, and a third symbol are used. Moreover, the middle symbol is always, "ㄧ", "ㄨ", or "ㄩ", which are found on a "#" key 18 of FIG. 1A. The "ㄦ" symbol is never used as a middle symbol, and is not considered as a possibility when the "#" key 18 is used to enter a middle symbol.

To enter a Chinese character that is represented by three symbols, three keys would have to be pressed. For example, the Chinese character "ㄍ" would be entered using "ㄎ", "ㄧ", and "ㄏ". To accomplish this, a "1" key 14, the "#" key 18, and a "9" key 16 of the keypad 13 would be pressed, respectively.

Unfortunately, mapping 37 symbols to only 10 keys of a keypad 13 creates many problems when entering Chinese characters. The problem results from each key having three or four symbols mapped to it. Because of this, many phonetic combinations are possible when keys on the keypad 13 are pressed. For example, when the Chinese character "ㄍ" is entered by pressing the "1" key 14, the "#" key 18, and the "9" key 16 of the keypad 13, other combinations of symbols exist other than "ㄎ", "ㄧ", and "ㄏ".

"1" key 14: "ㄎ", "ㄧ", "ㄣ", and "ㄜ"
4 possibilities;
"#" key 18: "ㄧ", "ㄨ", and "ㄩ"
3 possibilities; and
"9" key 16: "ㄧ", "ㄧ", "ㄧ", and "ㄌ"
4 possibilities.

As shown above, pressing the "1" key 14, the "#" key 18, and the "9" key 16 generates 4×3×4=48 combinations. This means that a user of the electronic device 10 would then have to choose the correct combination of symbols out of the 48 combinations generated. Clearly this is not desirable, as inputting Chinese characters is severely delayed by the enormous amount of combinations to choose from. Moreover, it is difficult to efficiently display 48 combinations on a screen of the electronic device.

Please refer to FIG. 1B. FIG. 1B is another electronic device 20 with a keypad 22 used to input MPS according to the prior art. The only difference between FIG. 1A and FIG. 1B is the symbols "ㄧ", "ㄨ", "ㄩ", and "ㄦ" are located on a "0" key 24 on FIG. 1B instead of the "#" key 18 on FIG. 1A. Unfortunately, the arrangement of keys on FIG. 1B contains the same problem as that of FIG. 1A. That is, pressing three keys can generate a maximum of 48 combinations of symbols. Thus, a poor mapping of Mandarin Phonetic Symbols to keys on each of the keypads 13 and 22 limits the ease in which Chinese characters can be inputted using MPS.

SUMMARY OF INVENTION

It is therefore a primary objective of the claimed invention to provide a method for arranging Mandarin Phonetic Symbols on a keypad in which "ㄧ", "ㄨ", and "ㄩ" symbols are not located on a same key of the keypad to solve the above-mentioned problems.

According to the claimed invention, a method for arranging 37 Mandarin Phonetic Symbols (MPS) on a keypad includes arranging the 37 symbols onto 11 or 12 keys of the keypad.

It is an advantage of the claimed invention that a maximum number of combinations of MPS generated by pressing three keys on the keypad is reduced to 16, making input of Chinese characters considerably faster and more convenient. Thus, in the worst case, a user only has to select the proper combination of symbols from 16 choices instead of 48 choices.

These and other objectives of the claimed invention will no doubt become obvious to those of ordinary skill in the art after reading the following detailed description of the preferred embodiment, which is illustrated in the various figures and drawings.

DETAILED DESCRIPTION

Figure 1A:
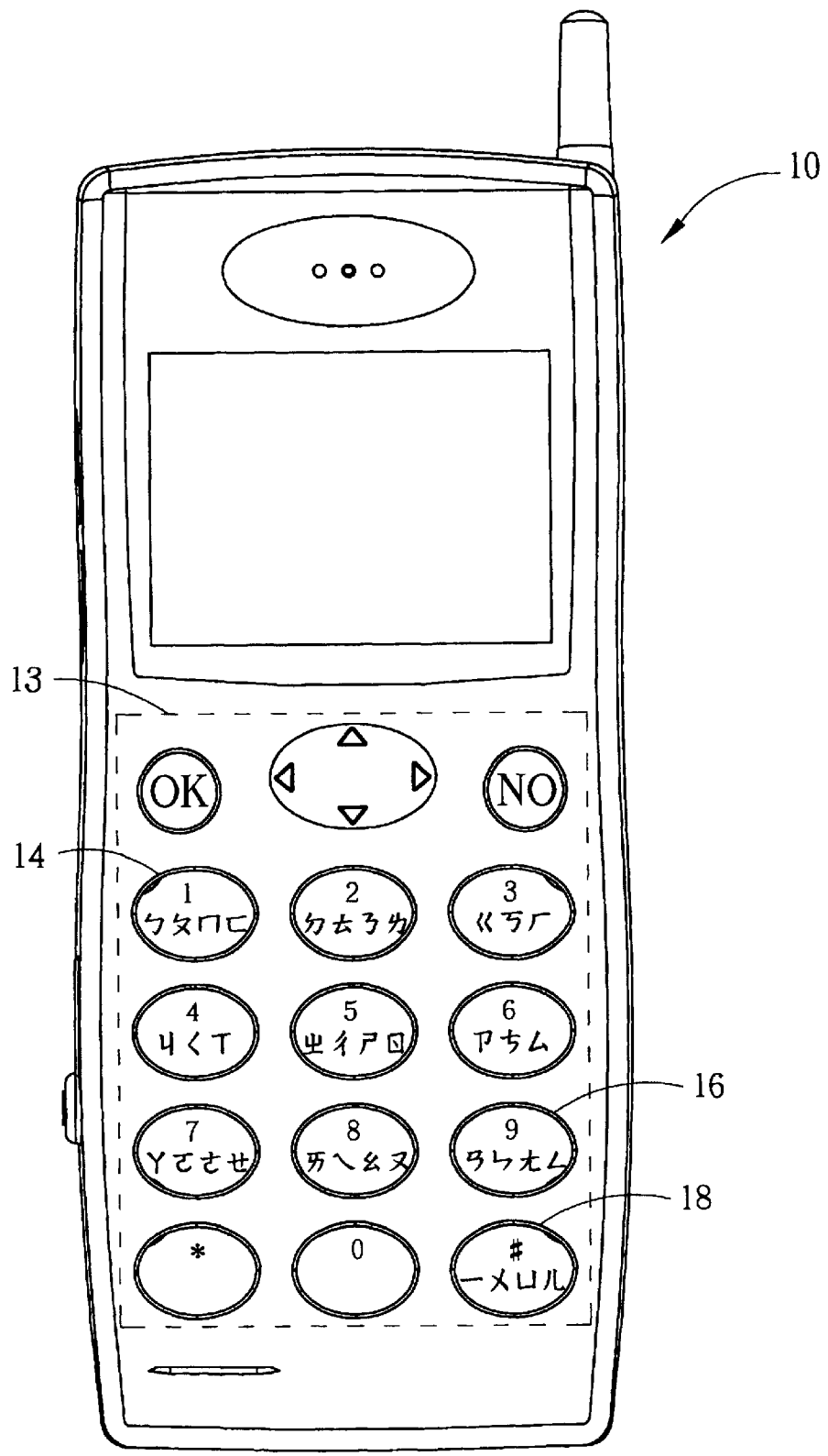
FIG. 1A is an electronic device with a keypad used to input Mandarin Phonetic Symbols (MPS) according to the prior art.
Figure 1B:
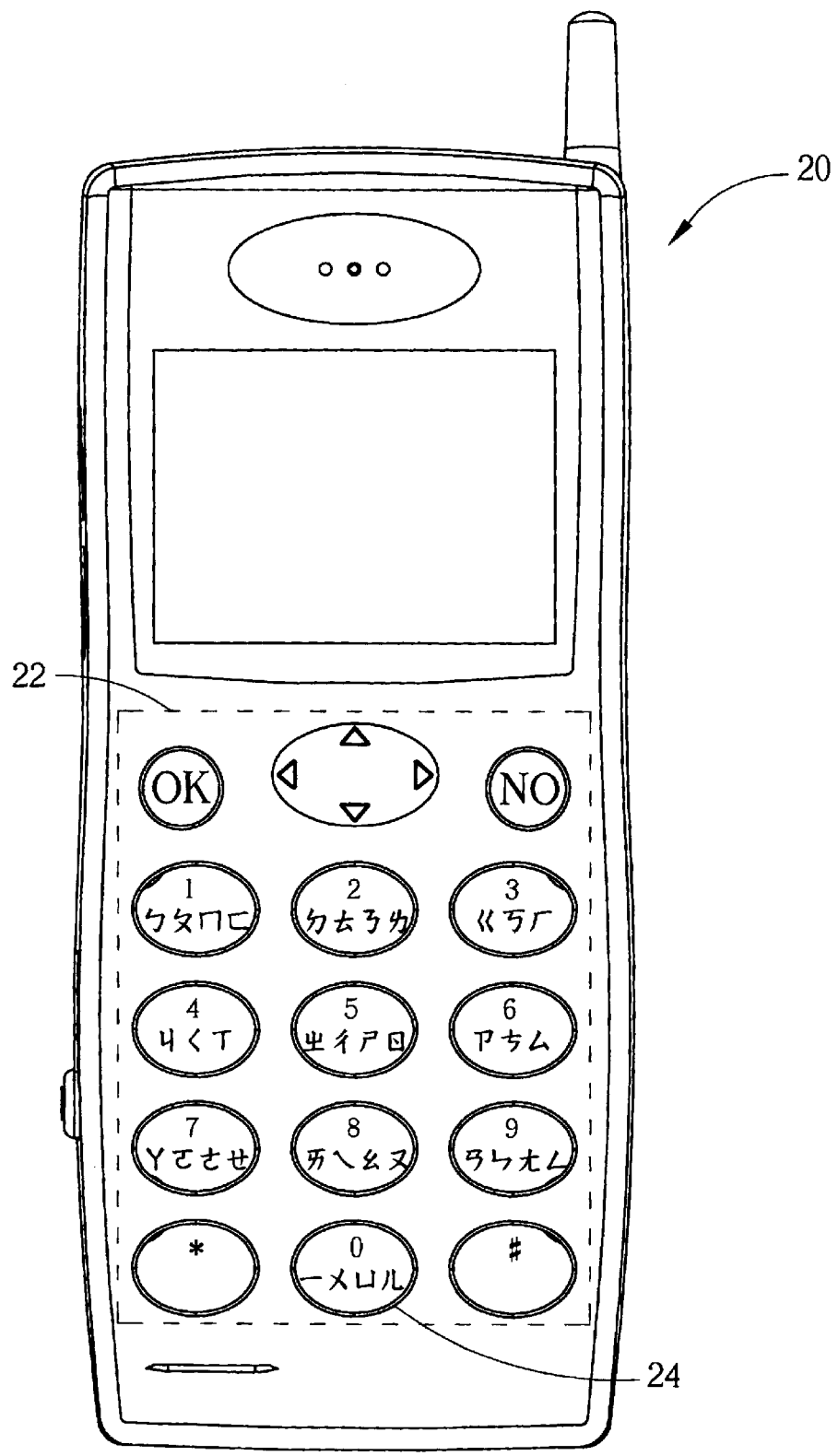
FIG. 1B is another electronic device with a keypad used to input MPS according to the prior art.
Figure 2:
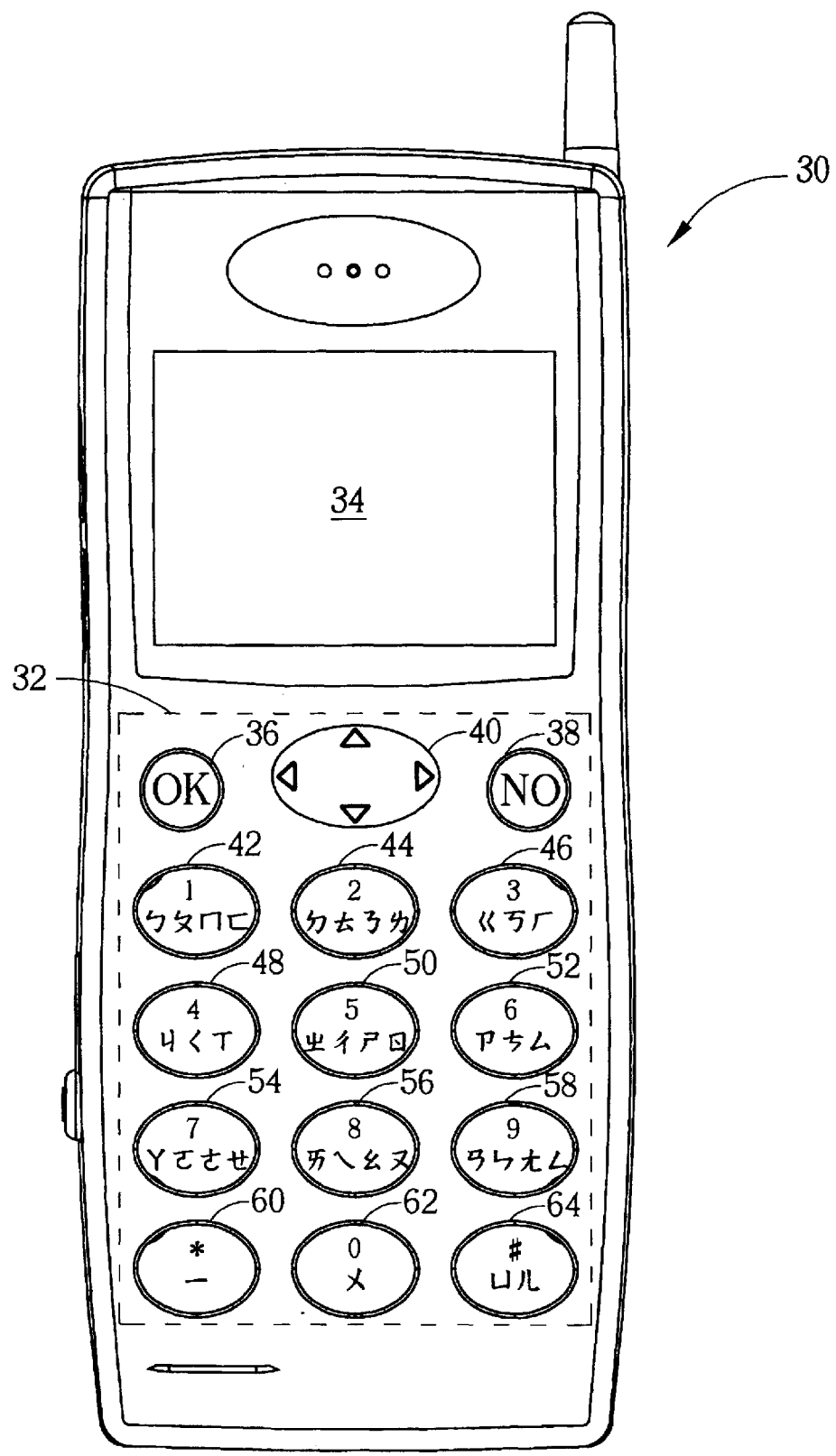
FIG. 2 is an electronic device with a keypad used to input MPS according to the present invention.

Please refer to FIG. 2. FIG. 2 is an electronic device 30 with a keypad 32 used to input Mandarin Phonetic Symbols (MPS) according to the present invention. The keypad 32 includes an "OK" key 36, a "NO" key 38, a four-directional arrow key 40, numbers "1" through "9" keys 42, 44, 46, 48, 50, 52, 54, 56, and 58, a "*" key 60, a "0" key 62, and a "#" key 64. In addition, the electronic device 30 contains a liquid crystal display (LCD) 34 for displaying output of the electronic device 30. The electronic device 30 can be a cellular phone, a personal digital assistant (PDA), or any device that uses both a display and a keypad.

Like the prior art electronic devices 10 and 20, 37 Mandarin Phonetic Symbols are mapped to keys on the keypad 32 of the electronic device 30. In fact, the only is difference is symbols mapped to the "*" key 60, the "0" key 62, and the "#" key 64. Specifically, symbols "ㄨ", "ㄧ" and "ㄩ" are each arranged onto different keys of the keypad 32. As with the prior art, symbol "ㄧ" is never used as a middle symbol when three symbols are used to represent a Chinese character. Therefore, the "ㄧ" symbol can be coupled with any one of the "ㄨ", "ㄧ" or "ㄩ" symbols. In the preferred embodiment of the present invention, the "ㄨ" symbol is mapped to the "*" key 60, the "ㄧ" symbol is mapped to the "0" key 62, and the "ㄩ" and "ㄧ" symbols are both mapped to the "#" key 64.

In the case where the "ㄨ", "ㄧ" and "ㄩ" symbols are mapped to different keys, a total of 12 keys of the keypad 32 are used for mapping. Alternately, arrangements can be used in which only 11 keys of the keypad 32 are used for mapping. In this case, two of the "ㄨ", "ㄧ" or "ㄩ" symbols would be mapped to the same key. However, mapping to 11 keys of the keypad 32 would reduce the usefulness of the present invention. Therefore, in the preferred embodiment of the present invention, 12 keys are used for mapping the Mandarin Phonetic Symbols.

Putting the "ㄨ", "ㄧ" or "ㄩ" symbols on different keys greatly reduces a number of phonetic combinations possible when three different keys of the keypad 32 are pressed in succession. To illustrate this, the same example that was used to show the shortcomings of the prior art will be used to show the advantages of the present invention. The Chinese character "ㄒ" is entered using "ㄒ", "ㄨ", and "ㄒ". To accomplish this, a "1" key 42, the "*" key 60, and a "9" key 58 of the keypad 32 are pressed in order. However, combinations of other phonetic symbols exist in addition to "ㄨ", "ㄧ", and "ㄩ".

"1"key 36: "ㄒ", "ㄧ", "ㄒ", and "ㄒ"

4 possibilities;

"*" key 60:"ㄨ"

1 possibility;

"9" key 58:"ㄒ", "ㄒ", "ㄒ", and "ㄒ"

4 possibilities.

As shown above, pressing the "1" key 36, the "*" key 60, and the "9" key 58 generates 4×1×4=16 combinations. Compared with the 48 combinations generated by the keypads 13 and 22 of the prior art, the keypad 32 used in the present invention provides an enormous improvement in reducing the number of possible phonetic combinations generated when inputting Chinese characters on the keypad 32. Selecting the appropriate combination of phonetic symbols is much easier than with the prior art. Therefore, Chinese characters can be entered much more quickly using the arrangement of symbols on the present invention keypad 32.

Figure 3:
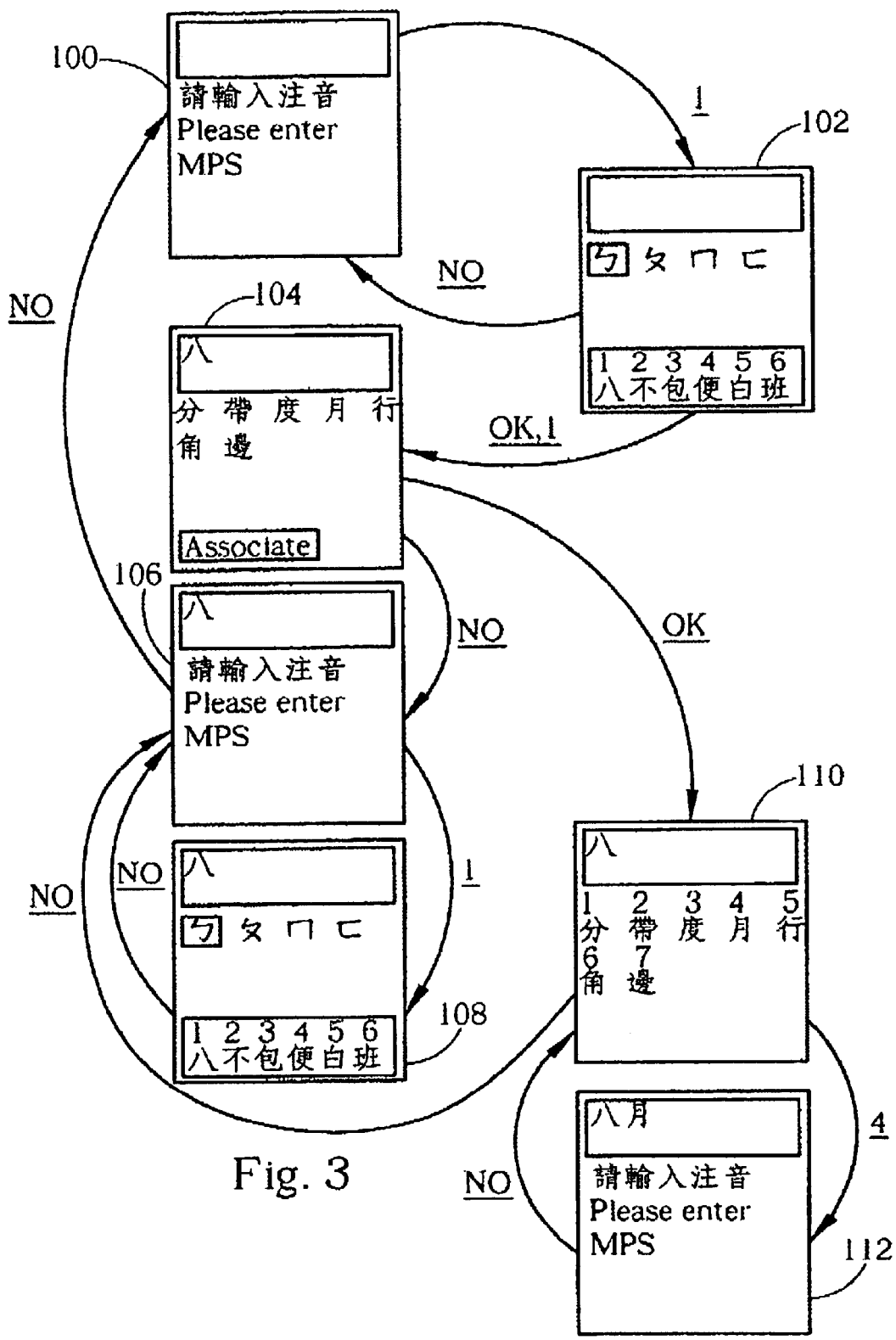
FIG. 3 and FIG. 4 are flowcharts illustrating various states of the electronic device when inputting Chinese characters.

Please refer to FIG. 3. FIG. 3 is a flowchart illustrating various states of the device 30 when inputting Chinese characters. For simplicity, in FIG. 3 only one symbol is selected at a time. The flowchart shown in FIG. 3 is explained in detail below.

step 100:

Start screen for entering MPS. To start entering Chinese characters, press one of the 12 input keys from "1" to "#", go to step 102;

step 102:

The "1" key 42 was pressed. This key has four phonetic symbols associated with it, "ㄒ", "ㄒ", "ㄒ", and "ㄒ". Since the "ㄒ" symbol is selected by default, a list of possible characters beginning with the "ㄒ" sound are listed at a bottom of the LCD 34 and the characters are numbered from 1–6. For convenience, characters with a highest frequency of use are displayed first in the list. If the "NO" key 38 is pressed, go back to step 100. If the "OK" key 36 is pressed, the list of characters at the bottom of the LCD 34 become active. Then, if one of the number keys from 1–6 is pressed, a corresponding character is chosen, go to step 104;

step 104:

The "OK" key 36 and the "1" key 42 were pressed. A Chinese character "ㄒ" is chosen since it corresponded with the "1" key 42. For convenience, a list of characters commonly associated with "ㄒ" are listed at the bottom of the LCD 34. To choose these listed characters, an "Associate" command must be chosen by pressing the "OK" key 36. If the "OK" key 36 is pressed, go to step 110. If the "NO" key 38 is pressed, go to step 106;

step 106:

The "ㄒ" character appears, and the electronic device 30 is ready for more MPS input. To input Chinese characters, press one of the 12 input keys from "1" to "#", go to step 108. If the "NO" key 38 is pressed, go to step 100;

step 108:

The "1" key 42 was pressed. This key has four phonetic symbols associated with it, "ㄒ", "ㄒ", "ㄒ", and "ㄒ". Since the "ㄒ" symbol is selected by default, a list of possible characters beginning with the "ㄒ" sound are listed at a bottom of the LCD 34 and the characters are numbered from 1–6. If the "NO" key 38 is pressed, go back to step 106;

step 110:

To associate a character with the "ㄒ" character, press one of the number keys from 1–6, and a corresponding character is chosen, go to step 112. If the "NO" key 38 is pressed, go back to step 106; and step 112:

A Chinese character "ㄒ" is chosen since it corresponded with the "4" key 48 in step 110. If the "NO" key 38 is pressed, go back to step 110.

Figure 4:
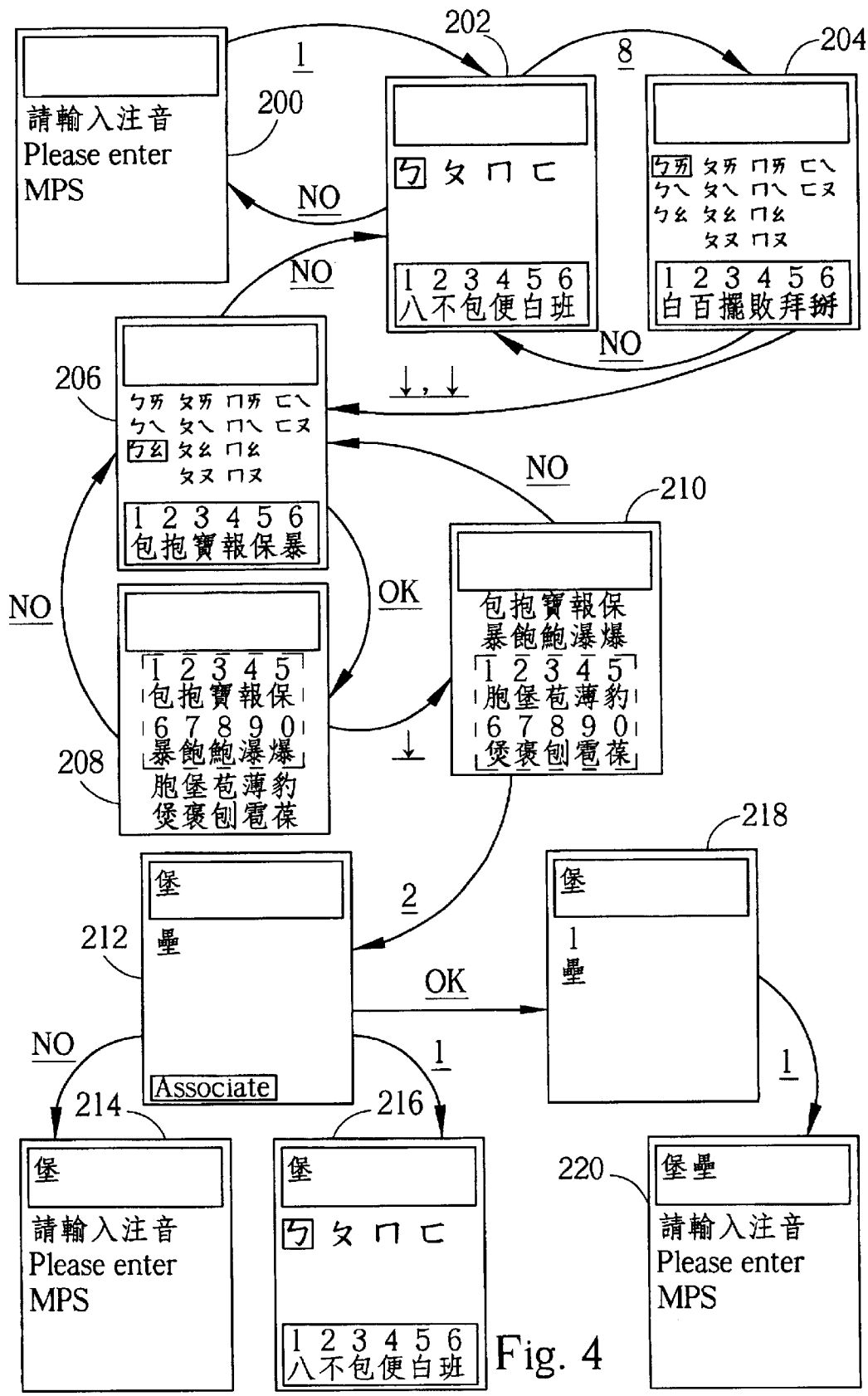

Please refer to FIG. 4. FIG. 4 is another flowchart illustrating various states of the electronic device 30 when inputting Chinese characters. In FIG. 4 more than one phonetic symbol is selected at a time. The flowchart shown in FIG. 4 is explained in detail below.

step 200:

Start screen for entering MPS. To start entering Chinese characters, press one of the 12 input keys from "1" to "#", go to step 202; step 202: The "1" key 42 was pressed. This key has four phonetic symbols associated with it, "ㄒ", "ㄒ", "ㄒ", and "ㄒ". Since the "ㄒ" symbol is selected by default, a list of possible characters beginning with the "ㄒ" sound are listed at a bottom of the LCD 34 and the characters are numbered from 1–6. For convenience, characters with a highest frequency of use are displayed first in the list. If the "NO" key 38 is pressed, go back to step 200. If another one of the 12 input keys from "1" to "#" is pressed, go to step 204;

step 204:

The "8" key 56 was pressed. This key has four phonetic symbols associated with it, "ㄒ", "ㄒ", "ㄒ", and "ㄒ". In this case the "ㄒ" symbol is considered an initial symbol, and the "ㄒ ㄒ" symbol is selected as the final symbol by default. Since the "ㄒ ㄒ" symbol combination is selected by default, a list of possible characters having the "ㄒ ㄒ" sound are listed at a bottom of the LCD 34 and the characters are numbered from 1–6. Furthermore, other phonetic symbol combinations are listed on the LCD 34. Phonetic symbol combinations having the same initial are displayed on the same column, and combinations having different initials are displayed on different columns. Alternately, phonetic symbol combinations having the same initial can also be displayed on the same row. If the "NO" key 38 is pressed, go back to step 202. If directions on the four-directional arrow key 40 are pressed, a different combination phonetic symbols is highlighted on the LCD 34, go to step 206;

step 206:

A "ˇ ˙" symbol combination is highlighted. If the "NO" key 38 is pressed, go back to step 202. If the "OK" key 36 is pressed, go to step 208;

step 208:

A list of most common characters having the phonetic combination "ˇ ˙" is shown. A set of 10 characters is associated with keys on the keypad 32. To select one of the associated characters, press one of the number keys from 1–9 or 0. To change the set of associated characters press a down direction on the four-directional arrow key 40, go to step 210. If the "NO" key 38 is pressed, go back to step 206;

step 210:

The list of most common characters from step 208 is shown. A different set of 10 characters is associated with keys on the keypad 32. To select one of the associated characters, press one of the number keys from 1–9 or 0, go to step 212. If the "NO" key 38 is pressed, go back to step 206;

step 212:

The "2" key 44 was pressed. Accordingly, a character "▪" that was associated with the "2" key 44 is displayed on the LCD 34. Furthermore, a character "▪" that commonly follows the character "▪" is also listed on the LCD 34 for ease of inputting the character "▪", if desired. To choose the listed character "▪", the "Associate" command is chosen by pressing the "OK" key 36. If the "OK" key 36 is pressed, go to step 218. If the "NO" key 38 is pressed, go to step 214. Alternately, if one of the 12 input keys from "1" to "#" is pressed, go to step 216;

step 214:

The "▪" character appears, and the electronic device 30 is ready for more MPS input. To input Chinese characters, press one of the 12 input keys from "1" to "#";

step 216:

The "1" key 42 was pressed. This key has four phonetic symbols associated with it, "ˇ", "˙", "ㄇ" and "ㄈ". Since the "ˇ" symbol is selected by default, a list of possible characters beginning with the "ˇ" sound are listed at the bottom of the LCD 34 and the characters are numbered from 1–6;

step 218:

To associate a character with the "▪" character, press a corresponding number key, and a corresponding character is chosen, go to step 220; and step 220: The character "▪" is chosen since it corresponded with the "1" key 42 in step 218.

Compared to the prior art, the present invention method for arranging Mandarin Phonetic Symbols on a keypad arranges symbols "ㄧ", "ㄨ" and "ㄩ" onto different of the keypad. Therefore, the maximum number of combinations of MPS generated by pressing three keys on the keypad of the present invention is reduced from 48 to 16, making input of Chinese characters considerably faster and more convenient. Thus, in the worst case, a user only has to select the proper combination of symbols from 16 choices instead of 48 choices. In addition, with the prior art method, it is difficult or impossible to display 48 combinations of MPS on the LCD 34 at one time. However, with the present invention method, it is only necessary to display 16 combinations at one time, which can be easily done.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A method for arranging Mandarin Phonetic Symbols on a keypad, Mandarin Phonetic Symbols consisting of 37 symbols, the method comprising:

arranging the 37 symbols onto 12 keys of the keypad with "ㄧ", "ㄨ" and "ㄩ" arranged onto * key, 0 key and # key.

2. The method of claim 1 wherein symbol "ㄚ" is arranged onto the same key with one of symbols "ㄧ", "ㄨ" and "ㄩ".

3. The method of claim 2 wherein symbol "ㄚ" is arranged onto the same key with symbol "ㄩ".

4. The method of claim 1 wherein the keypad is positioned on an electronic device.

5. The method of claim 4 wherein the electronic device is a personal data assistant (PDA).

6. The method of claim 4 wherein the electronic device is a cellular phone.

7. The method of claim 4 wherein the electronic device comprises a display panel for displaying information.

8. The method of claim 7 the display panel is a liquid crystal display.

9. The method of claim 7 wherein Mandarin Phonetic Symbols consist of a plurality of initials and a plurality of finals, the method further comprising: when entering a key on the keypad to input an initial and another key to input a final, possible combinations of initials and finals corresponding to the keys are displayed in a manner that combinations having the same initial are displayed on the same line, and combinations having different initials are displayed on different lines.

10. The method of claim 9 wherein the lines are columns.

11. The method of claim 9 wherein the lines are rows.

12. The method of claim 9 further comprising:

displaying characters corresponding to a selected initial, final or combination on the display panel.

13. The method of claim 12 wherein the characters are displayed according to frequencies of the characters being selected.

14. The method of claim 12 further comprising:

after selecting a character, displaying characters which may be entered later on the display panel.

15. The method of claim 12 further comprising:

using direction keys on the keypad to display characters corresponding to the selected initial, final or combination but not shown on the display panel.

16. The method of claim 12 further comprising:
associating characters with keys on the keypad.

17. The method of claim 16 further comprising:
using direction keys on the keypad to associate keys on the keypad with characters which are not associated with the keys.

18. A method for arranging Mandarin Phonetic Symbols on a keypad, Mandarin Phonetic Symbols consisting of 37 symbols, the method comprising:
arranging the 37 symbols onto 12 keys of the keypad with symbol "˙" arranged onto the same key as symbol "ㄨ".

19. A method for arranging Mandarin Phonetic Symbols on an electronic device, Mandarin Phonetic Symbols consisting of a plurality of initials and a plurality of finals totaling 37 symbols, the method comprising:
arranging the 37 symbols onto 12 keys of the electronic device; and
displaying possible combinations of initials and finals corresponding to the keys on a display panel of the electronic device in a manner that combinations having the same initial are displayed on the same line, and combinations having different initials are displayed on different lines when entering a key on the keypad to input an initial and another key to input a final.

* * * * *